US 6,719,863 B2

(12) United States Patent
Basque

(10) Patent No.: US 6,719,863 B2
(45) Date of Patent: Apr. 13, 2004

(54) SEALING WIRE TEMPERATURE CONTROL SYSTEM

(75) Inventor: Roland Basque, Brossard (CA)

(73) Assignee: Glopak Inc., Montreal (CA)

( * ) Notice: Subject to any disclaimer, the term of this patent is extended or adjusted under 35 U.S.C. 154(b) by 49 days.

(21) Appl. No.: 10/217,748

(22) Filed: Aug. 13, 2002

(65) Prior Publication Data
US 2004/0031552 A1 Feb. 19, 2004

(51) Int. Cl.[7] .............................................. B30B 15/00
(52) U.S. Cl. ..................... 156/64; 156/290; 156/308.4; 156/359; 156/583.1
(58) Field of Search ....................... 156/64, 290, 308.2, 156/308.4, 359, 580, 581, 583.1; 53/373.7, 375.9; 493/5, 189, 209; 100/315, 319, 320

(56) References Cited

U.S. PATENT DOCUMENTS

| 3,348,474 | A | 10/1967 | Virta et al. |
|---|---|---|---|
| 3,925,139 | A | 12/1975 | Simmons |
| 4,017,713 | A | 4/1977 | Lodi |
| 4,174,995 | A | 11/1979 | Ferguson et al. |
| 4,319,952 | A | 3/1982 | Schjeldahl |
| 4,377,738 | A | 3/1983 | Berg |
| 4,464,219 | A | 8/1984 | Colombo et al. |
| 4,506,146 | A | 3/1985 | Rice et al. |
| 4,599,847 | A | 7/1986 | Reenstra |
| 5,321,230 | A | 6/1994 | Shanklin et al. |
| 5,376,219 | A | 12/1994 | Sperry et al. |
| 5,561,964 | A | 10/1996 | McIntyre et al. |
| 5,597,499 | A | 1/1997 | Dunn |
| 5,678,390 | A | 10/1997 | Pruett et al. |
| 5,679,208 | A | 10/1997 | Sperry et al. |
| 5,715,645 | A | 2/1998 | Fukuda |
| 5,894,709 | A | 4/1999 | Fosshage |
| 5,947,019 | A | 9/1999 | Hutchinson |
| 6,003,288 | A | 12/1999 | Sperry et al. |
| 6,070,358 | A | 6/2000 | Meikle et al. |
| 6,119,590 | A | 9/2000 | Hutchinson |
| 6,301,859 | B1 | 10/2001 | Nakamura et al. |
| 6,315,850 | B1 * | 11/2001 | Hagedorn et al. .......... 156/228 |
| 6,391,133 | B1 * | 5/2002 | Dul ............................. 156/64 |

* cited by examiner

Primary Examiner—James Sells
(74) Attorney, Agent, or Firm—Carter Schnedler & Montlith

(57) ABSTRACT

A system for sealing sheets of plastic film together, comprising an apparatus having a first jaw, a second jaw, a sealing wire and a temperature sensor device. The first jaw and the second jaw are displaceable with respect to one another to a closed position, wherein the first jaw and the second jaw are opposed to one another with the sealing wire therebetween, such that sheets of plastic film positioned between the first and the second jaw in the closed position ate sealed together by the sealing wire when heated during a sealing cycle. The temperature sensor device is positioned to measure a temperature of the sealing wire during the sealing cycle. A power supply is connected to the sealing wire to supply an electric current thereto for heating the sealing wire. A controller is connected to the power supply and to the temperature sensor device for receiving temperature signals representative of the sealing wire temperature during the sealing cycle, the controller being inputted with a desired temperature signal from an operator, the controller automatically adjusting the value of the electric current from the power supply to the sealing wire as a function of the temperature signals from the temperature sensor device and the desired temperature signal.

15 Claims, 4 Drawing Sheets

US 6,719,863 B2

SEALING WIRE TEMPERATURE CONTROL SYSTEM

TECHNICAL FIELD

The present invention relates to sealing wires and sealing wire assemblies used in the packaging industry for fusing plastic film material and, more particularly, to a system for controlling the temperature of a sealing wire and to the attachment of the sealing wire in a sealing jaw.

BACKGROUND ART

In the plastic packaging industry, sealing heads having heated wires are frequently used to form seams in plastic film packages. Sealing heads are used to fuse sheets of plastic film to one another by melting the sheets of plastic film along specific areas, thereby forming seams.

Temperature control of the sealing wires is a major problem in sealing systems, yet temperature is an important factor in producing strong and effective seams. For instance, if a sealing wire is too cool, sealing cycles will be unnecessarily long and could provide weak seams. On the other hand, if a sealing wire is too hot, the sheets of film to be joined may be destroyed by the excessive temperature or the seals may have holes. Other problems occurring with excessively hot sealing wires include sheets of film sticking to the sealing head and gumming the sheets of film as well as causing hazardous smoke and fumes. The fused sheets of film may also leave residue on the sealing head or jaws. In the last case, the residue left on the sealing head can cause uneven temperatures along the sealing wire, leaving weaker seam sections.

SUMMARY OF INVENTION

It is a feature of the present invention to provide a new system for controlling the temperature of a sealing wire.

It is a further feature of the present invention to provide a method for controlling the temperature of the sealing wire of the present invention.

Another feature is to provide a new sealing head providing ease of replacement of the sealing wire.

According to the above features, from a broad aspect, the present invention provides an apparatus for sealing plastic film sheets together, comprising a first jaw having an elongated body with a first edge surface and a bore in the body having temperature access means. A second jaw has an elongated body with a second edge surface. A sealing wire is positioned on the first edge surface. The first jaw and the second jaw are displaceable to a closed position with respect to one another wherein the first edge surface of the first jaw and the second edge surface of the second jaw are opposed with the sealing wire therebetween such that sheets of plastic film positioned between the first and the second jaw in the closed position are sealed together by the sealing wire. A power supply is provide to heat the sealing wire. A temperature sensor device is received in the throughbore and positioned such that the temperature access means is visible by the temperature sensor device through the bore and such that the temperature sensor device is without contact with the sealing wire so as to measure a temperature of the sealing wire for controlling the power supply to maintain a substantially constant desired sealing wire temperature.

According to a further broad aspect of the present invention, there is provided a system for sealing sheets of plastic film together, comprising an apparatus having a first jaw, a second jaw, a sealing wire and a temperature sensor device. The first jaw and the second jaw are displaceable with respect to one another to a closed position, wherein the first jaw and the second jaw are opposed to one another with the sealing wire therebetween, such that sheets of plastic film positioned between the first and the second jaw in the closed position are sealed together by the sealing wire when heated during a sealing cycle. The temperature sensor device is positioned to measure a temperature of the sealing wire during the sealing cycle. A power supply is connected to the sealing wire to supply an electric current thereto for heating the sealing wire. A controller is connected to the power supply and to the temperature sensor device for receiving temperature signals representative of the sealing wire temperature during the sealing cycle. The controller is inputted with a desired temperature signal from an operator. The controller automatically adjusts the value of the electric current from the power supply to the sealing wire as a function of the temperature signals from the temperature sensor device and the desired temperature signal.

According to a still further broad aspect of the present invention, there is provided a method for sealing sheets of plastic film together at a desired sealing temperature, comprising the steps of i) measuring a temperature of a sealing wire of a sealing jaw being supplied with a known current pulse and without contact with the wire; and ii) heating the sealing wire to a desired sealing temperature to seal sheets of plastic film together by the sealing jaw by adjusting a second temperature of the sealing wire as a function of the known current pulse in relation to the first temperature and of a sensing of the second temperature, until the desired sealing temperature is obtained.

BRIEF DESCRIPTION OF DRAWINGS preferred embodiment of the present invention will now be described with reference to the accompanying drawings in which.

DESCRIPTION OF PREFERRED EMBODIMENTS

Figure 1:
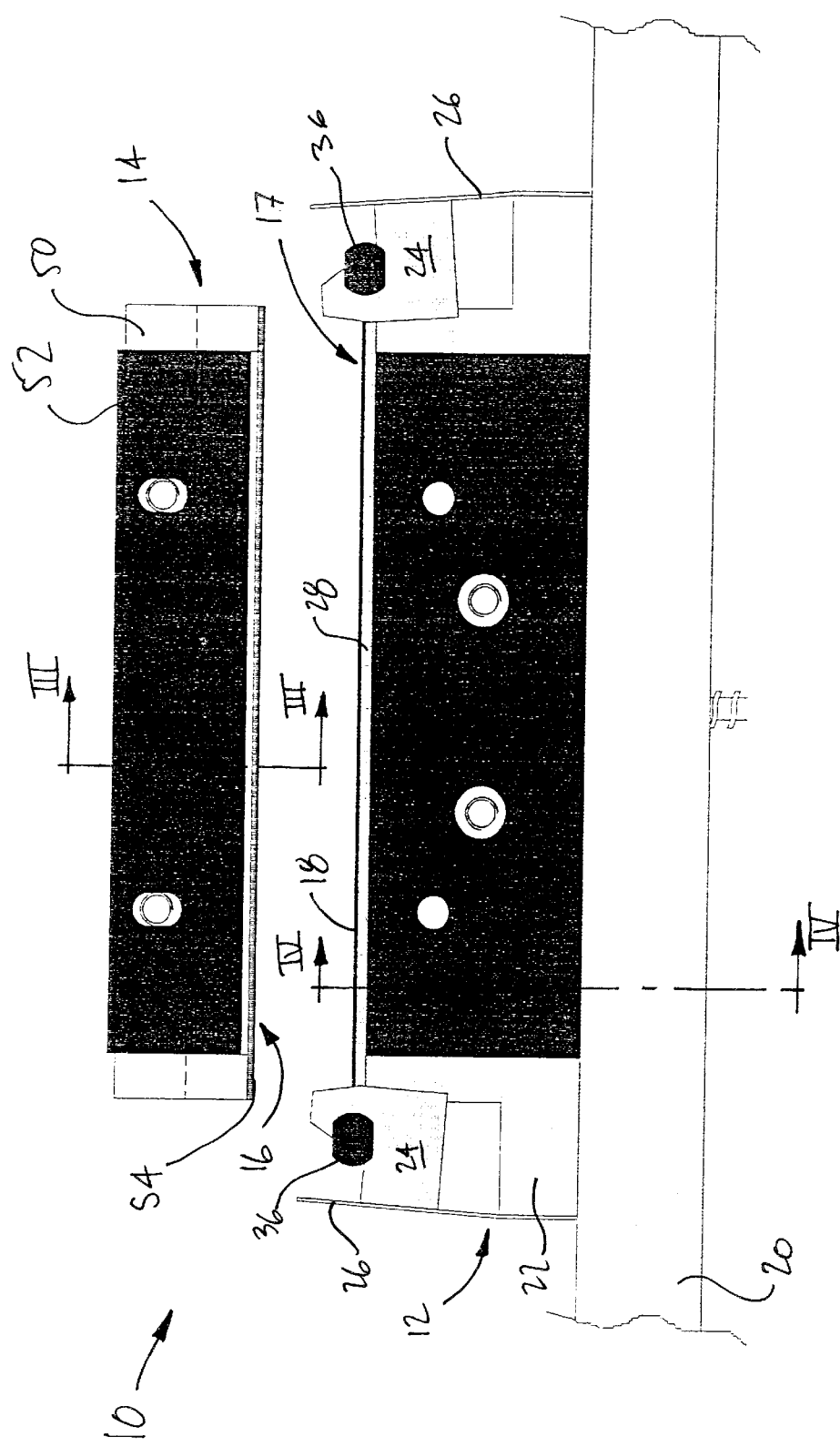
FIG. 1 is a front elevational view of a pair of sealing jaws constructed in accordance with the present invention.

Referring to the drawings, and more particularly to FIG. 1, a pair of sealing jaws constructed in accordance with the present invention is generally shown at 10. The sealing jaws 10 comprise a lower jaw 12 and an upper jaw 14. The upper jaw 14 is movable via various mechanisms (not shown) so as to have a lower backing edge surface 16 thereof come into contact with an upper sealing edge surface 17 of the lower jaw 12, which contains a sealing wire 18. Usually, two sheets of film are placed in between the lower backing edge surface 16 of the upper jaw 14 and the upper sealing edge surface 17 of the lower jaw 12, and then the upper jaw moves against the lower jaw to create a seam. As herein shown, the lower jaw 12 is secured to a stationary frame 20.

Figure 2:
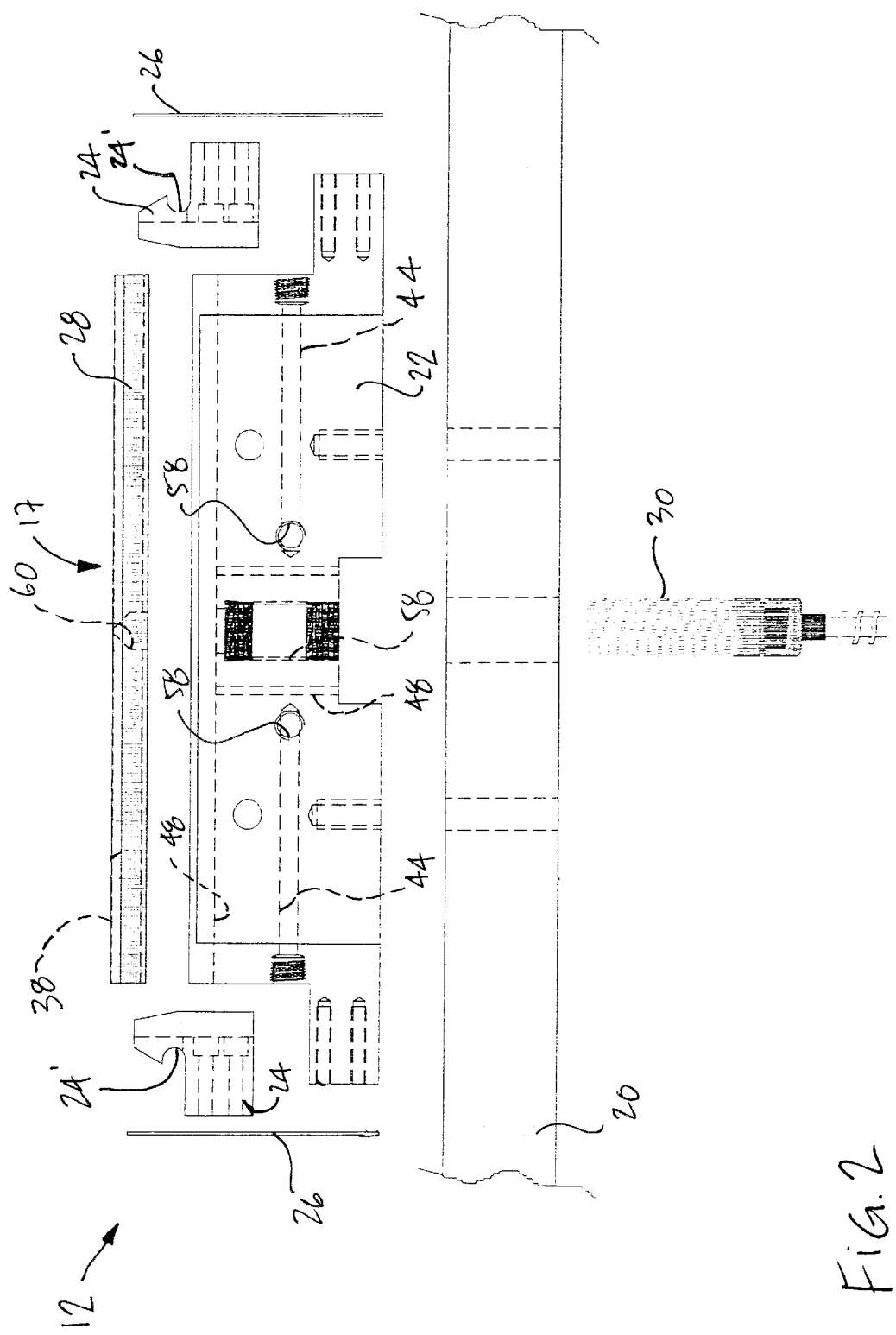
FIG. 2 is an exploded view of a lower jaw.
Figures 4A, 4B:
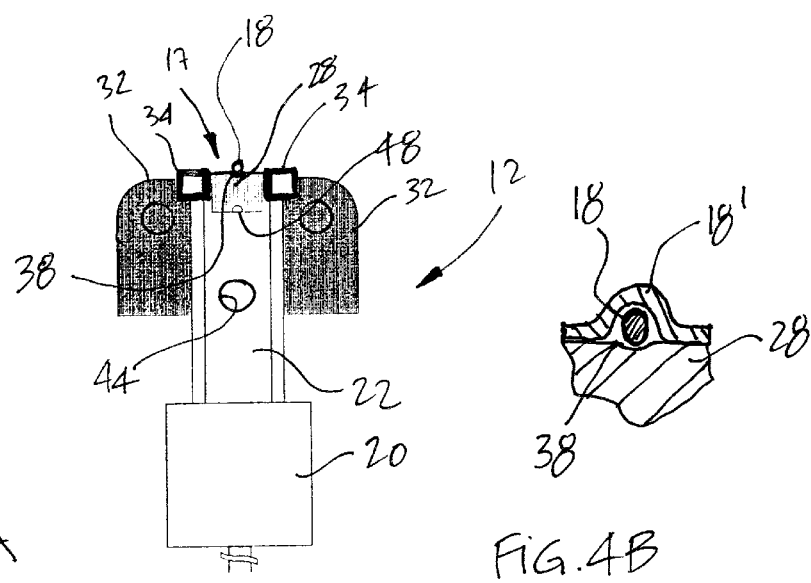
FIG. 4A is a cross-sectional view taken along cross-section line IV—IV of FIG. 1.
FIG. 4B is an enlarged cross-section view of the sealing wire on its support.

Referring to FIG. 2, the lower jaw 12 is shown having a seal bar 22, brackets 24, biasing posts 26, a sealing wire back support 28 and a temperature sensor 30. As best seen in FIG. 4A, clamping frames 32 are provided on both sides of the seal bar 22 and hold clamping rubber strips 34 squeezed against the sealing wire support 28.

As shown in FIG. 1, the brackets 24 are secured on opposed sides of the seal bar 22, and are also each connected to a respective flexible biasing post 26. The brackets 24 can pivot with respect to the seal bar 22. The biasing posts 26 bias the brackets 24 such that the brackets 24 are spring-biased away from the seal bar 22. The sealing wire 18 has connections 36 at opposed ends thereof, which are received in undercuts 24' provided in the brackets whereby to retain the sealing wire 18 taut across the brackets 24. As can be seen, in order to secure or replace a wire, it is necessary simply to flex one of the brackets inwardly and position the connections 36 in their respective undercuts 24' of the bracket. The restoring force of the biasing posts 26 applies a continuous tension on the sealing wire 18. Because the sealing wire 18 is easily installed in and removed from the lower jaw 12 by the biasing posts 26, no tools are required for such operations, and no supplemental fasteners are needed. This is advantageous, as sealing wires 18 are frequently replaced. It is pointed out that other biasing means may be used. Also, only one of the posts 26 is required to be biased, although having two biasing posts can provide greater tension to the sealing wire 18.

The sealing wire support 28 is formed of non-electric-conductive material and has a channel 38 for receiving the sealing wire 18 therein. The channel 38 of the sealing wire support 28 ensures that the sealing wire 18 remains in position. The sealing wire support 28 preferably consists of a nonabrasive, nonstick contact surface for the sealing wire 18 such that a surface material is not required between the support 28 and the sealing wire 18 (e.g., PTFE). The sealing wire support 28 preferably also provides electrical resistance and thermal management between the sealing wire 18 and the seal bar 22. Materials well suited for use as sealing wire support 28 include thermoplastics and alumina-based ceramic materials. For instance, polybenzeneimidazole is well suited for such an application. As shown in FIG. 4B, a thin PTFE sheet 18' overlies the sealing wire 18 to prevent plastics material from sticking to the wire during fusing. This is conventional in the art. It is pointed out that the thin PTFE sheet 18' has been removed from FIG. 4A for clarity purposes.

Figure 5A:
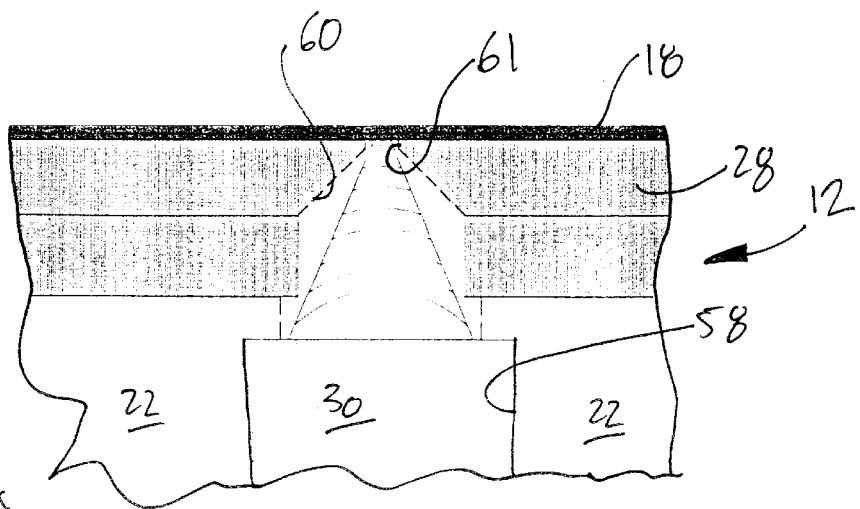
FIG. 5A is an enlarged schematic view of a temperature sensor mounted to the lower jaw.
Figure 5B:
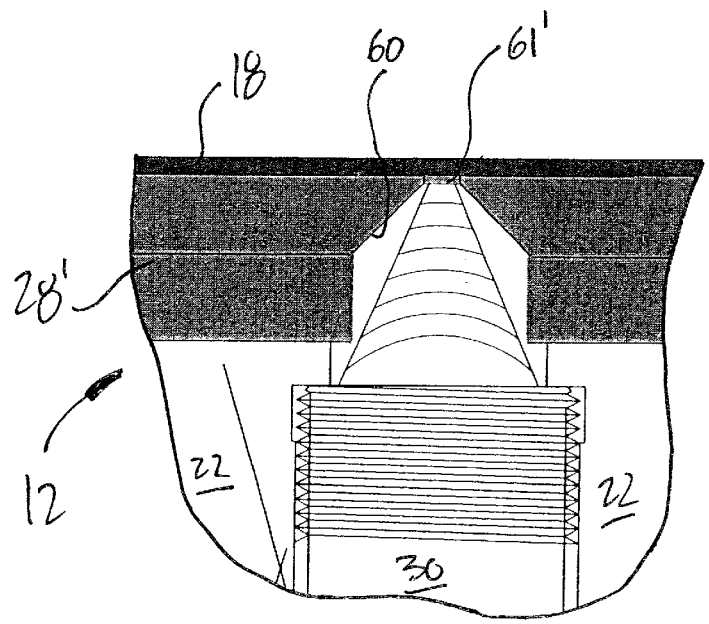
FIG. 5B is an enlarged schematic view of a temperature sensor mounted to the lower jaw according to another embodiment of the present invention.

Referring to FIGS. 2 and 5A, a through bore 58 is shown in the seal bar 22. The through bore 58 is sized such that the seal bar 22 can receive the temperature sensor 30 therein. The temperature sensor 30 is preferably an infrared sensor having a cylindrical portion. An inverted countersink 60 is provided in the sealing wire support 28 so as to be in register with the through bore 58 when the sealing wire support 28 is secured to the seal bar 22. The countersink 60 will enable the temperature sensor 30 to see the sealing wire 18 through a very small hole 61, so as to sense the temperature thereof without touching the latter and provide a signal representative of the detected temperature. Referring to FIG. 5B, the sealing wire support of an alternative embodiment of the present invention is generally shown at 28', and is similar to the sealing wire support 28 of FIG. 5A, save for the fact that the sealing wire support 28' does not have a hole 61, but rather a thin wall 61' at the end of the countersink 60. In the sealing wire support 28', the temperature sensor 30 is positioned to measure the temperature of an underside of the thin wall 61'. By its thinness, the thin wall 61', also being heat-conductive, is rapidly subjected to temperature variations when the sealing wire 18 is heated. Furthermore, the thin wall 61' defines a closed cavity with the countersink 60 such that dust or melted plastic residues cannot block the view of the sensor 30. Therefore, in both sealing wire supports 28 and 28', because the sensor 30 is not in contact with the sealing wire 18, the temperature sensor 30 will not act as a heat sink that will falsify the temperature readings. It also does not affect the current flowing through the sealing wire 18 during its sealing cycle. On the other hand, it is desired that the thin wall 61' be of a material that will change temperature rapidly, such as aluminum or the like, to reflect a change of temperature of the sealing wire 18.

Referring to FIG. 2, although not required, the lower jaw 12 has a channel 44 that generally extends longitudinally through the seal bar 22 so as to define a passage for a cooling liquid such as water. The channel 44 is disrupted in a center of the seal bar 22 by the through bore 58, whereby a continuation to the channel 44 will extend out of the seal bar 22 to surround the through bore 58. For instance, a tubing received in ends of the channel 44 can be used for such purpose. Similarly, an inlet tubing and an outlet tubing are well suited to provide a flow of a cooling liquid in the channel 44, which has tapped ends to receive, for instance, tubing adapters. A channel 48 is provided in the vicinity of an upper edge of the lower jaw 12, between the seal bar 22 and the sealing wire support 28, and extends into the seal bar 22 so as to have a cooling gas such as air circulate therein for cooling the seal bar 22 and the sealing wire support 28. Ends of the channel 48 are preferably tapped for receiving tubing adapters, for instance, such that air can be provided thereto by tubing or flexible hoses.

Figure 3:
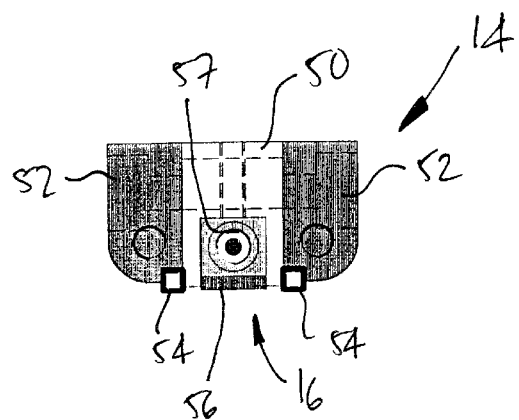
FIG. 3 is a cross-sectional view taken along cross-section line III—III of FIG. 1.

Referring to FIGS. 1 and 3, the upper jaw 14 is shown having a jaw bar 50, clamping frames 52, clamping rubber strips 54, a contact pad 56 and a cooling insert 57. The clamping rubber strips 54 are held squeezed between the seal bar 50 and the clamping frames 52. The contact pad 56 is a highly thermally conductive material, such as high-temperature-resistant silicone with a shore "A" hardness of 50. The cooling insert 57 receives a circulation of fluid therein for absorbing heat from the contact pad 56.

When sheets of film are to be sealed to one another, they are positioned between the upper jaw 14 and the lower jaw 12 and arrested, and the jaws 12 and 14 are brought together such that the contact pad 56 is on one side of the film sheets and the sealing wire 18 on the other side. The clamping rubber strips 54 and 34 are also opposed to each other, and ensure that the sheets of film do not move with respect to the jaws 12 and 14 when received therebetween. As the contact pad 56 consists of a highly thermally conductive material, it will absorb heat from the sealing wire 18, and this heat transfer going through the sheets of film will melt the film therebetween, thereby forming a linear seam. Once an adequate sealing seam is obtained between the sheets of film, the upper jaw 14 is separated from the lower jaw 12. The sealed sheets of film are then removed.

It is obvious that the sealing jaws 10 may have different configurations. For instance, although the jaws 12 and 14 have been described as lower and upper jaws, respectively, the sealing jaws 10 may be used with the jaws 12 and 14 being in a horizontal plane. Also, the temperature sensor 30 can be in either one of the jaws 14 and 14, and does not require to be in the same jaw as the sealing wire 18. The clamping rubber strips 54 and 34 do not have to be made of rubber, as long as they provide the necessary adhesion for clamping the sheets of film between the jaws 12 and 14.

Figure 6:
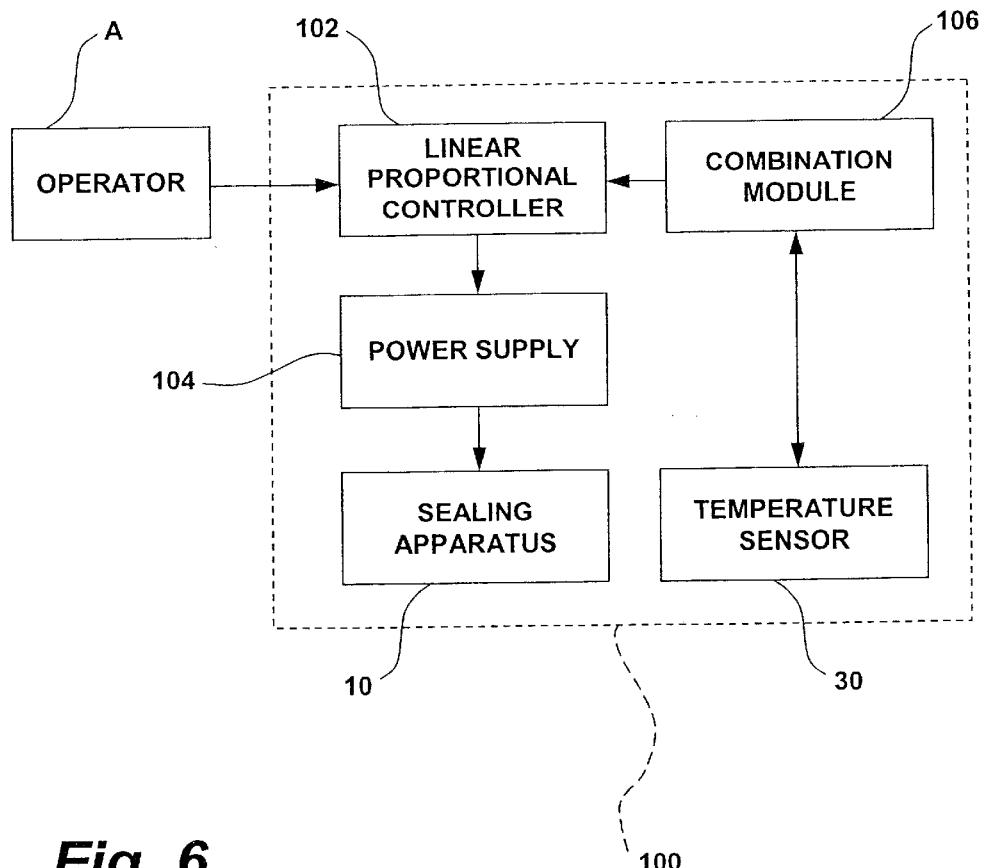
FIG. 6 is a block diagram illustrating the temperature sensor of a sealing wire temperature control system of the present invention.

The temperature of the sealing wire 18 is controlled by a sealing wire temperature control system 100, as illustrated in FIG. 6. The sealing wire temperature control system 100 has a linear proportional controller 102 that enables an operator A to control the temperature of the sealing wire 18. The operator A simply selects a desired temperature and inputs it into the controller 102. The linear proportional controller 102 is connected to a power supply 104, which supplies the sealing wire 18 with the proper electrical current pulse in accordance with the desired temperature set into the controller 102 by the operator A. The temperature sensor 30, which senses the temperature of the sealing wire 18, when receiving electrical current pulses, provides feedback signals to the linear proportional controller 102. The feedback signals are proportional to the temperature that is measured. The combination module 106 conditions the feedback signals for the controller 102. The system 100 autocalibrates on a cycle-to-cycle basis and detects and rejects errant signals using mean referencing. This system eliminates the need for temperature controllers and current detection transformers. Also, no signals are taken directly by contact with the sealing wire 18, as the detection is done by an infrared sensor or the like that measures the element during heat cycle intervals, and therefore measures actual wire temperature at each cycle, ensuring continuous automatic control. The linear proportional controller 102 will adjust the current pulses sent to the sealing wire 18 by controlling the power supply 104 dependent on the feedback pulses received from the temperature sensor 30 until the desired temperature reference set by the operator A is obtained. A signal, not shown, such as a light indicator, would then signal to the operator that the sealing jaws are ready for operation.

The linear proportional controller 102 is preferably a Crydom LPCV linear proportional controller that conforms the power signal delivered thereto to the electrical current sent to the sealing wire 18. The power supply 104 preferably is a Crydom PS-240 power supply with a Sola 15 kVA buck-boost transformer, with an Everest Model 3000.4ZH radiation pyrometer. Finally, the combination module is, for instance, an Allen-Bradley 1746-NIO4V analog combination module.

The configuration of the sealing jaw 12 and the sensor 30 ensures the precise measurement of temperature of the sealing wire 18, while the sealing temperature control system 100 automatically controls the temperature of the sealing wire 18 as a function of a desired inputted signal and feedback temperature measurement signals. Using the equation:

$$V = R \times I,$$

with V being the voltage, R the resistance of the sealing wire 18, and I the current, a correlation is established by the sealing wire temperature control system 100 that relates the temperature to the current. Initially (e.g., for the first use of a wire), the equation will be used to calculate a value of the resistance. Thereafter, the value of the resistance of the sealing wire 18 being known, an operator can choose a temperature, and the sealing wire temperature control system 100 will adjust the current I supplied to the sealing wire 18 accordingly.

It is within the ambit of the present invention to cover any obvious modifications of the embodiments described herein, provided such modifications fall within the scope of the appended claims.

What is claimed is:

1. An apparatus for sealing plastic film sheets together, comprising:
   a first jaw having an elongated body with a first edge surface and a bore in said body, said bore having temperature access means;
   a second jaw having an elongated body with a second edge surface;
   a sealing wire positioned on the first edge surface, said first jaw and said second jaw being displaceable to a closed position with respect to one another wherein the first edge surface of the first jaw and the second edge surface of the second jaw are opposed with the sealing wire therebetween such that sheets of plastic film positioned between the first and the second jaw in the closed position are sealed together by the sealing wire, a power supply to heat the sealing wire; and
   a temperature sensor device received in the bore and positioned such that said temperature access means is visible by the temperature sensor device through the bore and such that the temperature sensor device is without contact with the sealing wire so as to measure a temperature of the sealing wire for controlling said power supply to maintain a substantially constant desired sealing wire temperature.

2. The apparatus according to claim 1, wherein said temperature access means is one of an open end in the first edge surface and a closed end separated from the first edge surface by a thin wall.

3. The apparatus according to claim 1, wherein the temperature sensor device is an infrared sensor.

4. The apparatus according to claim 1, wherein the first edge surface consist of any one of a thermoplastic and an alumina-based ceramic material.

5. The apparatus according to claim 4, wherein the first edge surface consists of polybenzeneimidazole.

6. The apparatus according to claim 1, wherein at least one of the first jaw and the second jaw has at least one fluid passageway adapted to receive a flow of cooling fluid therein.

7. The apparatus according to claim 1, wherein the sealing wire is held in tension on the first edge surface by a biasing support.

8. The apparatus according to claim 7, wherein the sealing wire has connections ends for detachable engagement with the biasing support.

9. The apparatus according to claim 8, wherein the connection ends of the sealing wire are received in undercuts in support brackets of the biasing support.

10. The apparatus according to claim 9, wherein the biasing support has a pair of resilient posts biasing the support brackets outwardly so as to flex to permit the sealing wire to be installed when flexed in one direction and to taut the sealing wire by restoring force.

11. A system for sealing sheets of plastic film together, comprising:
   an apparatus having a first jaw, a second jaw, a sealing wire and a temperature sensor device, the first jaw and the second jaw being displaceable with respect to one another to a closed position, wherein the first jaw and the second jaw are opposed to one another with the sealing wire therebetween, such that sheets of plastic film positioned between the first and the second jaw in the closed position are sealed together by the sealing wire when heated during a sealing cycle, the temperature sensor device being positioned to measure a temperature of the sealing wire during said sealing cycle;

a power supply connected to the sealing wire to supply an electric current thereto for heating the sealing wire; and a controller connected to the power supply and to the temperature sensor device for receiving temperature signals representative of the sealing wire temperature during said sealing cycle, the controller being inputted with a desired temperature signal from an operator, said controller automatically adjusting the value of said electric current from the power supply to the sealing wire as a function of the temperature signals from said temperature sensor device and the desired temperature signal.

12. The system according to claim 11, wherein the temperature sensor device is an infrared sensor not in contact with the sealing wire.

13. A method for sealing sheets of plastic film together at a desired sealing temperature, comprising the steps of:

i) measuring a first temperature of a sealing wire of a sealing jaw being supplied with a known current pulse and without contact with said wire; and ii) heating the sealing wire to a desired sealing temperature to seal sheets of plastic film together by the sealing jaw by adjusting a second temperature of the sealing wire as a function of the known current pulse in relation to the first temperature and of a sensing of the second temperature, until the desired sealing temperature is obtained.

14. The method according to claim 13, wherein the step ii) is performed by:

i) calculating a resistance of the sealing wire with the known current pulse;

ii) relating the temperature of the sealing wire to the known current pulse; and iii) heating the sealing wire to a desired sealing temperature to seal sheets of plastic film together by the sealing jaw by sensing the temperature of the sealing wire as a function of a current pulse supplied to the sealing wire and changing the intensity of said current pulse until said desired sealing temperature is obtained.

15. The method according to claim 14, wherein said step iii) is repeated for subsequent sealing of sheets of plastic film together by the sealing jaw to maintain said desired sealing temperature.

* * * * *